United States Patent Office 2,972,412
Patented Feb. 21, 1961

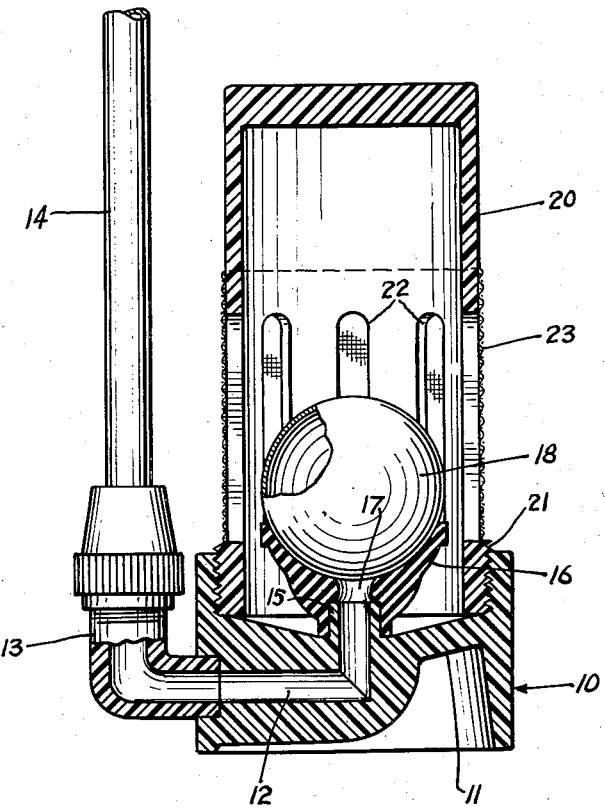

2,972,412
FLOAT VALVE AND STRAINER

Stanley A. Lundeen, 2946 Stinson Blvd., Minneapolis, Minn.

Original application Mar. 25, 1955, Ser. No. 496,802, now Patent No. 2,902,155, dated Sept. 1, 1959. Divided and this application June 19, 1958, Ser. No. 743,066

6 Claims. (Cl. 210—123)

This application relates to a new and improved float valve and strainer. More particularly, this invention relates to a float valve and brine strainer for use in a water softening system.

This application is a division of my co-pending application Serial No. 496,802, for "Automatic Water Softening System" filed March 25, 1955, now Patent No. 2,902,155 issued September 1, 1959.

As is well known, hard water contains principally dissolved calcium and magnesium salts. It is well known to soften hard water by passing it through an ion exchange material. In the course of its passage through the ion exchange material, calcium and magnesium ions in the water are replaced by other metallic ions, such as sodium, which produce more readily soluble salts. After a period of time depending upon the volume of water passed through the bed of ion exchange material and its degree of hardness, the mineral bed becomes spent and loses its capacity to further soften the water. When this occurs, or preferably, a short time before this occurs, it is normal practice to regenerate or revitalize the bed of water softening mineral by contacting it with a brine solution.

In automatic and semi-automatic water softening systems it is the usual practice to accomplish regeneration by passing a stream of brine through the bed of water softening mineral. The brine is prepared in a separate vessel in communication with the tank containing the bed of ion exchange material and at the appropriate time, the previously prepared brine solution is withdrawn from the brine storage tank and introduced into the water softening tank. As described in said application Serial No. 496,802, this is normally accomplished by passing a stream of fresh water through a venturi tube whose throat is connected with the bottom of the brine storage tank. It will be readily seen that unless some means is provided to prevent it, when all of the brine has been withdrawn from the brine storage tank, air will be drawn by the venturi and passed into the water softening tank. This is objectionable for a number of reasons, as will be recognized by those skilled in the art.

It is the principal object of this invention to provide a quick-acting float valve means for use in the brine storage tank of an automatic or semi-automatic water softening system which will immediately be closed upon withdrawal of brine from the storage tank to prevent air being drawn into the system.

It is a further object of this invention to provide float valve means which will at the same time strain out silt, sediment, undissolved salt particles and the like from the brine prior to its introduction into the water softening system.

It is another object of this invention to provide float valve and strainer means which are not corroded by concentrated brine.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

The invention is illustrated by the single figure of the drawing which shows the float valve and strainer in vertical cross section.

Referring to the drawing, the float valve means comprises a base 10 adapted to rest on the bottom of a brine storage tank of a water softening system and desirably held, for example, by clips. The base is provided with a bottom wall member 11. A passage 12 extends from the center of the upper side of the bottom wall member 10 of the base to an outer side surface of the base wall. There the passage 12 is in direct fluid communication with a suitable fitting 13 by means of which one end of a piece of tubing 14 is connected to the float valve means. Tubing 14 is preferably formed of flexible synthetic resinous material, though it may be formed of a metal resistant to the corrosive effect of brine. The opposite end of tubing 14 is connected to the throat of a venturi tube.

An integral annular projection 15 is provided on the top surface of the bottom wall of the base 10 around the opening at the inside end of passage 12. The projection 15 is centrally disposed with respect to the edge walls of the base. A resilient annular concave cup 16 having a central opening 17 is fitted over the projection 15 to form a valve seat. A hollow spherical ball float 18 is adapted to rest in the resilient valve seat. The upper surface of base 10 is internally threaded. A cylindrical cage retaining member 20 closed at its upper end to prevent escape of the ball 18 is externally threaded at 21, around its lower open end, to engage the internal threads of the base and hold the cage in place. A plurality of slots 22 or similar perforations are provided in the walls of the cage member 20 to permit passage of brine into the valve member. A screen 23 is preferably provided over the perforations 22 to hold back any excess undissolved salt in the tank and to strain out dirt, sediment, etc.

The inside diameter of the cage 20 is somewhat greater than the diameter of the ball float 18 and its length is preferably at least twice the diameter of the ball to permit the float to move freely in a vertical direction away from the valve seat within the cage while at the same time guiding the ball to insure seating of the ball in the resilient valve seat upon withdrawal of the brine. When the tank in which the valve means is located contains no liquid, the ball 18 rests in the resilient valve seat and is tightly held there by suction from the venturi, thereby preventing air from being sucked into the system. On the other hand, when the lower portion of the tank contains brine, the ball 18 floats free from the resilient valve seat while retained within the cage 20 and thus keeps the valve open. As the brine is withdrawn during regeneration the ball 18 descends with the level of the brine until it seats in the cup 16 and is sucked tightly into place. All parts of the valve means are preferably formed of synthetic resinous material to eliminate corrosion due to the action of the brine.

It is apparent that many modifications and variations of this invention as hereinbefore set forth may be made without departing from the spirit and scope thereof. The specific embodiments described are given by way of example only and the invention is limited only by the terms of the appended claims.

I claim:
1. A float valve and strainer means which comprises a base member having a bottom wall, a passage extending from centrally in said bottom wall through said base member and adapted to be connected to a suction source, a resilient annular cup-shaped valve seat adapted to be disposed above said bottom wall around the opening to said passage, a ball float member adapted to sit in said resilient cup-shaped seat, and a perforated retaining member over said ball float and connected to said base, said retaining member being generally cylindrical, closed at one end and threaded at its opposite open end to engage threads in said base member and being of a size to permit relative vertical movement of said float ball, the perforations of said retaining member being covered with screen.

2. A float valve and strainer means according to claim 1 further characterized in that the parts thereof are composed of synthetic resinous material.

3. A float valve means for introducing liquid into a vessel and permitting withdrawal of liquid from that vessel without withdrawing air, said valve means comprising a horizontal base member adapted to rest on the bottom of the vessel, a central vertical passage in said base member, means in communication with said passage to connect said passage alternately to a source of liquid and to a suction source for withdrawal of liquid, said valve means adapted to be wholly contained within said vessel with which it is used and connected to said liquid source and to said suction source by tubular conduit means extending within said vessel from the top thereof, a resilient annular cup-shaped valve seat at the entrance to said central vertical passage, a float ball member adapted to seat in said resilient cup-shaped member, and a perforated vertically extending retaining member secured to said base and around said ball float, said base member, connecting means, float member, cup-shaped member and retaining member being composed of non-corrosive material.

4. A float valve member according to claim 3 further characterized in that said base member is provided with a cylindrical threaded recess surrounding said central passage, said retaining member is generally cylindrical, closed at one end, threaded at its open end, of such dimension and length as to permit limited vertical movement of said ball float, and adapted to engage the recess of said base.

5. A float valve means according to claim 3 further characterized in that the perforations of said retaining member are covered with screen.

6. A float valve means according to claim 3 further characterized in that the parts thereof are composed of synthetic resinous material.

References Cited in the file of this patent

UNITED STATES PATENTS

| | | |
|---|---|---|
| 342,478 | Tatum | May 25, 1886 |
| 583,736 | Eppich | June 1, 1897 |
| 1,306,150 | Kessler | June 10, 1919 |
| 1,989,199 | Hummert | Jan. 29, 1935 |
| 2,784,733 | Martinez | Mar. 12, 1957 |